(12) United States Patent
Minami

(10) Patent No.: US 7,206,121 B2
(45) Date of Patent: Apr. 17, 2007

(54) OPTICAL PATH SWITCHING DEVICE

(75) Inventor: Kohji Minami, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 10/529,429

(22) PCT Filed: Sep. 26, 2003

(86) PCT No.: PCT/JP03/12304

§ 371 (c)(1),
(2), (4) Date: Mar. 25, 2005

(87) PCT Pub. No.: WO2004/029712

PCT Pub. Date: Apr. 8, 2004

(65) Prior Publication Data

US 2005/0270632 A1    Dec. 8, 2005

(30) Foreign Application Priority Data

Sep. 27, 2002 (JP) .............................. 2002-283704

(51) Int. Cl.
*G02F 1/00* (2006.01)
(52) U.S. Cl. ...................................... 359/321; 359/322
(58) Field of Classification Search ................ 359/279, 359/321, 322, 323
See application file for complete search history.

(56) References Cited

U.S. PATENT DOCUMENTS 4,039,251 A     8/1977     Allen, Jr. et al.

FOREIGN PATENT DOCUMENTS

| JP | 01-230017 | 9/1989 |
|----|-----------|--------|
| JP | 03-200936 | 9/1991 |
| JP | 09/211402 | 8/1997 |

*Primary Examiner*—David N. Spector
(74) *Attorney, Agent, or Firm*—David G. Conlin; David A. Tucker; Edwards Angell Palmer & Dodge LLP

(57) ABSTRACT

An optical path switching device comprises a light transmitting portion, a first electrode layer, a second electrode layer, a first adhesive layer, a second adhesive layer, a first supporting portion and a second supporting portion. The light transmitting portion has a plurality of refracting regions wherein the refractive indexes of a light can be uniformly controlled by the electro-optic effect in the direction perpendicular to the traveling direction of the light, and the thickness of the light transmitting portion changes along the traveling direction of the light. The first electrode layer and the second electrode layer are so formed as to sandwich the light transmitting portion and as to cover at least a part of the refracting regions. The first supporting portion is tightly arranged on a side of the first electrode layer, which side is out of contact with the light transmitting layer, via the first adhesive layer. The second supporting portion is tightly arranged on a side of the second electrode layer, which side is out of contact with the light transmitting layer, via the second adhesive layer.

18 Claims, 12 Drawing Sheets

Fig. 5(a) Step 1
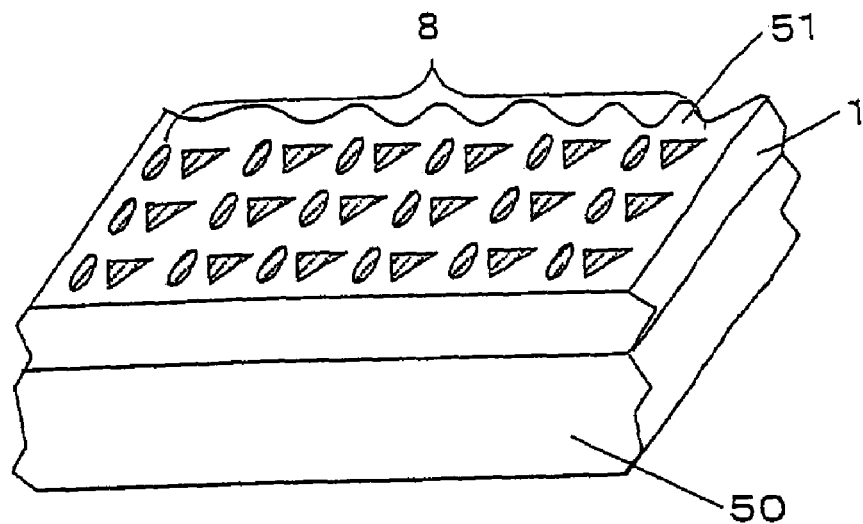
Fig. 5(b) Step 2
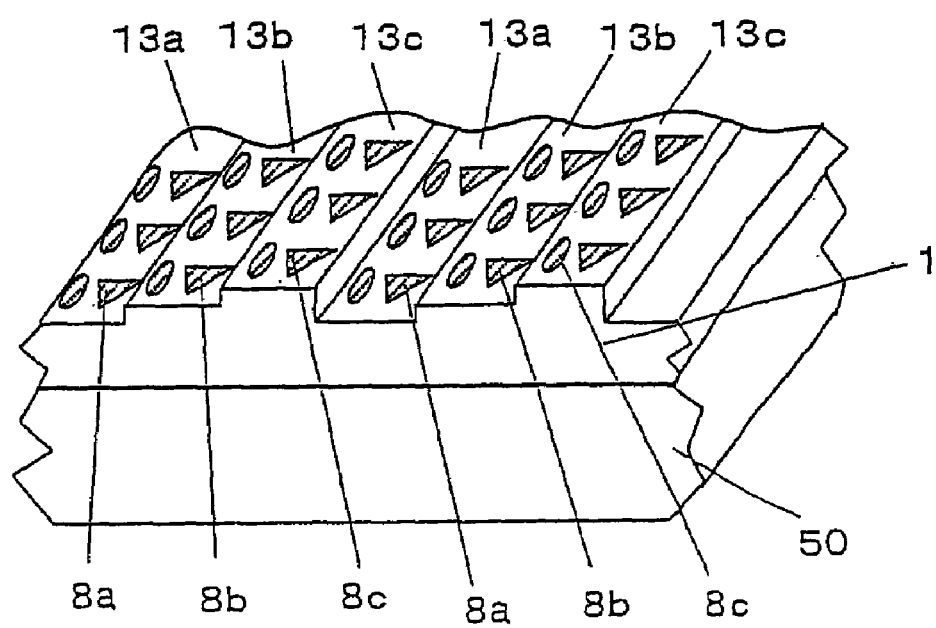

Fig. 6(a) Step 3
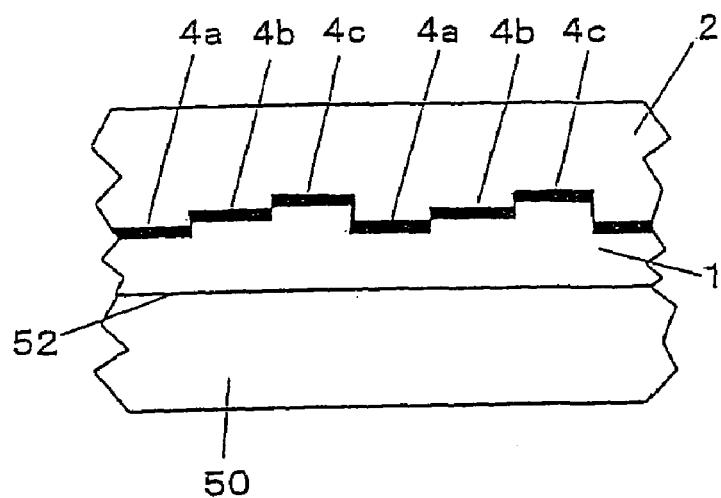
Fig. 6(b) Step 4
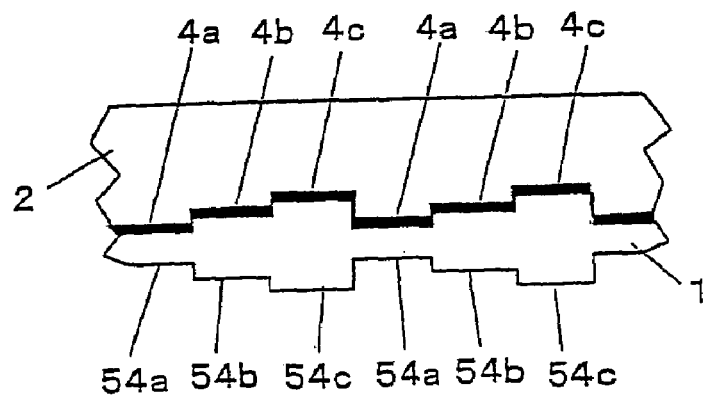
Fig. 6(c) Step 5
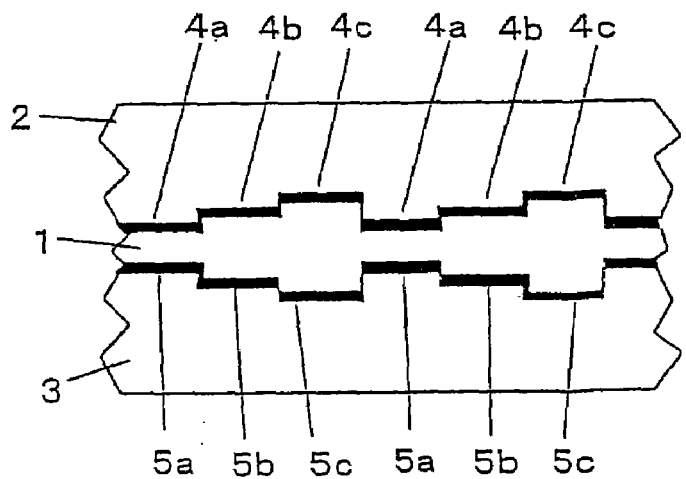

102

Fig. 12
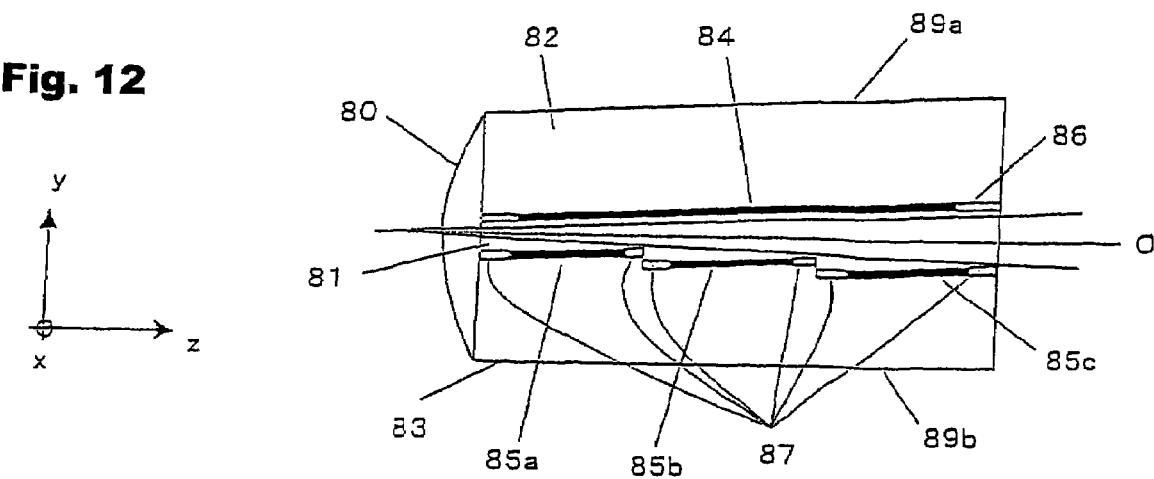
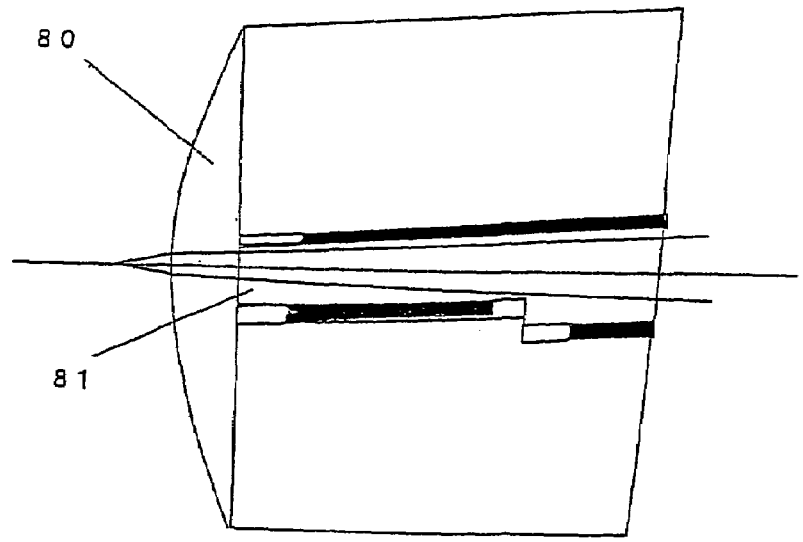
Diagram showing enlarged entrance portion

OPTICAL PATH SWITCHING DEVICE

TECHNICAL FIELD

The present invention relates to an optical path switching element, and relates to an electrical field modulation-type optical path switching element which uses a bulk-type electro-optic crystal to electrically implement a lens effect.

BACKGROUND ART

There is a technique for modulating a refractive index by an electro-optic effect so as to switch an optical path. A device for obtaining a lens effect by an electro-optic effect disclosed in Patent Document 1 (Japanese Unexamined Patent Application No. Hei 1(1989)-230017) will be described below with reference to FIGS. 13 and 14.

The device of FIG. 13 has a configuration that an electro-optic medium (crystal material portion) 301 is placed between electrodes 302 and a voltage applied from a voltage power supply 303 is changed so that a change in refractive index is caused. Herein, the lens effect is obtained by forming each of the electrodes 302 into a shape capable of obtaining the lens effect, as shown in FIG. 13. The light condensing performance of the device includes a light condensing property in one direction, and the device functions as a so-called focal point variable cylindrical lens.

In addition, in FIG. 14, devices 314 and 316 each of which is the same as the above-described device are connected to each other via a half-wavelength plate 315. Herein, the half-wavelength plate rotates a deflection direction by 90 degrees, so that the device 314 and the device 316 provide the same effects in terms of modulation in the refractive index that is caused by the electro-optic effect.

In these connected devices, a light convergence effect in two directions, x and z in FIG. 14, can be obtained for the above-described reasons.

In the device having the electro-optic effect of Patent Document 1, each of the electrodes 302 is formed into a shape having a curved surface in accordance with the direction in which the optical path is desired to be switched, in order to obtain the lens effect.

In this configuration, one measure to effectively obtain the change in the refractive index that is caused by the electro-optic effect is to reduce the thickness of the entire crystal material portion 301 through which light passes in an optical path switching device by utilizing the property that the thinner the crystal material portion 301 is, the greater the change in refractive index.

In some cases, however, only a reduction in the entire thickness does not effectively lower a driving voltage. In the case where, for example, the crystal material portion 301 has a uniform thickness relative to the direction in which a ray bundle propagates, as in the device shown in FIG. 13, and when diverging light enters, the diameter of the ray bundle becomes maximum at an emission end of the device. Therefore, the ratio of light passing through the excessively thick crystal material portion 301 to light passing through the device becomes high on the light source side from the emission end. As a result, the electrical field intensity is relatively reduced for the same voltage, and an appropriate electro-optic effect for the light that passes through the device cannot be obtained.

In addition, though in the case where a great number of refractive regions in lens form are sequentially aligned in a direction in which the ray bundle propagates, the entire device has a great lens effect. However, in this case as well, the device has a shortcoming in that the greater the number of aligned refractive regions in lens form, the longer and larger the device becomes.

Taking the above into consideration, it is conceivable to form an optical path switching device where solely the thickness of the crystal material portion 301 is changed in a simple manner, as much as possible in accordance with a change in the ray bundle of the diverging light, so that the driving voltage for obtaining the same refractive effects in the refractive region having the same area approaches the minimum; however, the following problem arises in the case where this is simply implemented.

First, the crystal material portion 301 is partially made very thin; therefore, it becomes difficult to form a position reference for the assembly of the optical path switching device itself. In addition, the formation of the position reference on a plane that is not parallel to this optical path easily makes the position reference unclear. Furthermore, in some cases, the thickness of this crystal material portion becomes extremely thin; therefore, the electro-optic effect of the crystal material portion, i.e., an important portion of the optical path switching device, is negatively affected to a great extent, in such a manner that the crystal material portion is warped at the time of manufacture of the device or the crystal material portion is warped due to a change in the temperature after being made to adhere to a portion having a different linear expansion coefficient.

Furthermore, in the case where the above-described change in the thickness is achieved as a result of connection of crystal material portions (314 to 316) having different thicknesses, as shown in FIG. 14, the thinner the crystal material portions are made, the higher precision is required in a process for adjusting the optical path, and the manufacturing process itself becomes complicated when trying to solve the problem of reflection that is caused in the discontinuous structure, in such a manner that it becomes necessary to polish the respective surfaces to be connected as entrance and emission surfaces before the connection.

Here, in addition to the above, in the case where the thickness of the crystal material portion 301 is reduced in accordance with the ray bundle and the aperture is restricted at the emission end, the probability increases that the light that has failed to completely pass through the crystal material portion 301 is strongly reflected from the interface on the top and on the bottom of this crystal material portion 301. This reflected light mingles with the light emitted from the optical path switching device and, thereby, becomes stray light within the optical system where this device is used. Therefore, reduction of such light needs to be considered.

DISCLOSURE OF THE INVENTION

An object of the present invention is to provide an optical path switching device wherein the thickness of the crystal material portion ranging from an entrance end for light to an emission end is changed without forming a discontinuous portion so that a driving voltage for obtaining a refraction effect of a certain degree approaches the minimum in refractive regions having the same area in the optical path switching device for diverging light and wherein the crystal material portion is prevented from being warped, a reference for manufacturing the device can be easily formed and a position reference used at the time of assembly of the device can be easily formed.

The present invention provides an optical path switching device comprising: a light transmitting portion where a plurality of refraction regions are formed so that the refractive index of light can be controlled uniformly in a direction perpendicular to a direction in which light propagates by using an electro-optic effect, the thickness of the light transmitting portion varying along the direction in which light propagates; a first electrode layer and a second electrode layer which are formed so as to sandwich the light transmitting portion and cover at least the portions of the refractive regions; a first support portion which is placed so as to make close contact with the first electrode layer via a first adhesive layer on a side that does not make contact with the light transmitting portion; and a second support portion which is placed so as to make close contact with the second electrode layer via a second adhesive layer on a side that does not make contact with the light transmitting portion.

Here, the electro-optic effect means an effect that the direction in which light that has entered a medium propagates is changed by changing the thickness of this medium through an application of a voltage so that a refractive index of light changes in a portion of the medium through which light passes. Such a medium having the electro-optic effect is in general referred to as an electro-optic medium or a piezoelectric crystal medium.

A piezoelectric crystal medium such as $LiNbO_3$ can be used for the light transmitting portion of the present invention, a conductive epoxy resin of a type into which metal particles have been mixed or an organic silver-based conductive resin of a type into which silver oxide has been mixed, and an iron-based material on which conductive plating has been carried out or an insulating material medium such as PMMA or polyimide can be used for the first and second support portions, a conductive material such as Al can be used for the first and second electrode layers, and an adhesive material such as epoxy-based or acryl-based material can be used for the first and second adhesive layers, respectively.

As a result of this, the first and second support portions are provided so as to sandwich the light transmitting portion, and therefore, the light transmitting portion can be prevented from being damaged while being used even in the case where the light transmitting portion is formed as a thin layer. Polishing and processing, for example, can be easily carried out on the entrance surface and emission surface of the light transmitting portion without damaging the light transmitting portion which has been enforced by the first and second support portions.

In addition, in the case where the optical path switching device is incorporated into an apparatus such as an optical pickup or a scanner, at least one of the first and second support portions can be used as an attachment reference, and therefore, the alignment becomes easy so that working time during the manufacturing process can be shortened.

Furthermore, the light transmitting portion can be formed as a thin layer, and therefore, it becomes possible to increase the intensity of the electrical field that occurs in the light transmitting portion and as a result, the refractive index modulation effect can be effectively utilized.

In the optical path switching device, the thickness of the crystal material portion ranging from the entrance end for light to the emission end is changed in the refractive regions having the same area for diverging light so that the driving voltage for obtaining a refraction effect of a certain degree approaches the minimum and such a change in the thickness is provided in the light transmitting portion. The light transmitting portion in which it is difficult to set a reference due to the thinness and which is easily deformed is supported by the first support portion and the second support portion. Therefore, an effect of prevention of a warp in the light transmitting portion is provided and in addition, the two support portions can be utilized for the formation of a reference for the manufacture of the device and for the formation of a position reference at the time of the assembly of the device.

In addition, the optical path switching device of the present invention is characterized in that the light transmitting portion has an entrance surface and an emission surface which are approximately perpendicular to the direction in which light propagates, and the thickness of the light transmitting portion varies substantially symmetrically relative to an optical axis of light in such a manner as to increase in step form nearer the emission surface, the light entering approximately perpendicularly the entrance surface.

As a result of this, even in the case where a ray bundle that enters the optical path switching device is diverging light, the thickness of the light transmitting portion is changed so as to increase in accordance with the amount of spreading in the diameter of the ray bundle, and therefore, the thickness of the light transmitting portion can be reduced in the vicinity of the entrance portion. Accordingly, the use of a excessively large crystal material portion is prevented and it becomes possible to reduce an applied voltage since the thickness of the light transmitting portion changes in step form and since the same voltage is applied to a number of regions which are arranged side by side in the direction in which light propagates.

In addition, approximately perpendicularly to the optical axis, the voltage can be applied to every portion, to which the voltage is to be applied, of the light transmitting portion of which the thickness changes, and therefore, a change in the refractive index that is caused as a result of the electro-optic effect can be most effectively obtained.

In addition, the present invention provides the optical path switching device characterized in that the light transmitting portion has an entrance surface and an emission surface which are approximately perpendicular to the direction in which light propagates and wherein the thickness of the light transmitting portion in the direction perpendicular to the direction in which light propagates varies in such a manner as to increase in step form nearer the emission surface, and while one of electrode-formed surfaces varies relative to an optical axis of light that enters approximately perpendicularly the entrance surface, the other electrode-formed surface is formed as a plane without steps.

As described above, the thickness of the light transmitting portion changes in step form and the light transmitting portion has a structure where one electrode-formed surface has no step, and thereby, one of the first support portion and the second support portion can be used as a position reference and the other can be used as a reference for the formation of the thin light transmitting portion of which the thickness changes in step form, and thus, the respective support members can be efficiently used.

In addition, the present invention provides the optical path switching device characterized in that the light transmitting portion has an entrance surface and an emission surface which are approximately perpendicular to the direction in which light propagates, and the thickness of the light transmitting portion in the direction perpendicular to the direction in which light propagates varies in such a manner as to increase in taper form nearer the emission surface.

As described above, the thickness of the light transmitting portion is changed in taper form, and thus the light transmitting portion can be provided with the structure in taper form that matches the spreading of diverging light when the diverging light passes through the crystal material portion in taper form after entering the crystal material portion and the maximum modulation can be obtained in every position of the device along the direction in which light propagates, though the electro-optic effect cannot be obtained in the best state.

Further, the present invention is characterized in that the light transmitting portion is formed of a crystal material that has an electro-optic effect through application of a voltage and that the first electrode layer and second electrode layer are each formed of either a single body or portions which are physically separated from each other.

In addition, the first support portion and the second support portion are each formed of a conductive material so that the voltage can be directly applied to the two support portions, and therefore, refractive index modulation in the refractive regions of the optical path switching device can be implemented without separately providing an external electrode.

Alternatively, in the case where the first support portion and the second support portion are each formed of an insulating material that has at least one through hole, a first external electrode is formed on the surface of the first support portion which does not make contact with the light transmitting portion, a second external electrode is formed on the surface of the second support portion which does not make contact with the light transmitting portion and the first external electrode are conductively connected to each other as well as the second electrode layer and the second external electrode are conductively connected to each other, each of the connections being made through said at least one through hole.

As a result of this, the optical path can be converted even in the case where a material having no conductivity is used for the first and second support portions and this is particularly effective in the case where it is necessary that the sides of the device make contact with a metal material.

The present invention also provides a manufacturing method for the optical path switching device, that comprises the steps of: making a light transmitting portion adhere to a temporary support member, the light transmitting portion having refractive regions; processing a surface of the light transmitting portion opposite to the temporary support member side into a first repeating structure in step form; forming a first electrode layer on the first repeating structure; making a first support portion adhere to the light transmitting portion via a first adhesive layer, the first support portion having a surface that makes contact with the first electrode layer and that has been processed into a second repeating structure in step form, the adhesion being made so that the first and second repeating structures are joined to each other; removing the temporary support member; forming a third repeating structure in step form in the other surface of the light transmitting portion from which the temporary support member has been removed; forming a second electrode layer on the third repeating structure; making a second support portion adhere to the light transmitting portion via a second adhesive layer, a surface of the second support portion that makes contact with the second electrode layer having been processed into a fourth repeating structure in step form, the adhesion being made so that the third and fourth repeating structures are joined to each other; cutting and dividing the resulting product into a plurality of structures using end portions of any of the repeating structures in step form as a cutting reference; and polishing and processing the end surfaces that have been obtained by the cutting.

With this method, it is possible to efficiently manufacture an optical path switching device having a light transmitting portion, a surface of the light transmitting portion opposite to both support portions having a structure in step form.

The present invention also provides a manufacturing method for the optical path switching device, that comprises the steps of: forming a first electrode layer on a flat surface of a light transmitting portion, the light transmitting portion having refractive regions; making the flat surface of the light transmitting portion adhere to a first support portion via a first adhesive layer; processing the other surface of the light transmitting portion that does not make contact with the first support portion into a repeating structure of a plurality of steps; forming a second electrode layer on the repeating structure; making a second support portion adhere via a second adhesive layer to the surface of the light transmitting portion having the second electrode layer formed thereon, the second support portion having a surface that does not make contact with the light transmitting portion and that has a repeating structure in serrated form, the repeating structure in serrated form having the same period as the repetition period of the repeating structure in step form; and cutting and dividing the resulting product into a plurality of structures using end portions of the repeating structure in serrated form of the second support portion as a cutting reference.

With this method, it is possible to efficiently manufacture an optical path switching device having a light transmitting portion, one of surfaces of the light transmitting portion being in step form, the other surface being in flat form.

The present invention also provides a manufacturing method for the optical path switching device, that comprises the steps of: forming a first electrode layer on a flat surface of a light transmitting portion, the light transmitting portion having refractive regions; making the flat surface of the light transmitting portion adhere to a first support portion via a first adhesive layer; processing the other surface of the light transmitting portion that does not make contact with the first support portion into a plurality of repeating structures in taper form; forming a second electrode layer on the repeating structure in taper form; making a second support portion adhere via a second adhesive layer to the surface of the light transmitting portion having the second electrode layer formed thereon, the second support portion having a surface that does not make contact with the light transmitting portion and that has a repeating structure in serrated form, the repeating structure in serrated form having the same period as the repetition period of the taper form; and cutting and dividing the resulting product into a plurality of structures using end portions of the repeating structure in serrated form of the second support portion as a cutting reference.

With this method, it is possible to efficiently manufacture an optical path switching device having a light transmitting portion of a taper form structure.

BRIEF DESCRIPTION OF THE DRAWINGS

FIGS. 5(a) and 5(b) are diagrams showing a manufacturing method for the optical path switching device according to Embodiment 1.

FIGS. 6(a) to 6(c) are diagrams showing the manufacturing method for the optical path switching device according to Embodiment 1.

FIG. 12 is a diagram showing a case where the entrance surface of the optical path switching device is a curved surface.

BEST MODE FOR CARRYING OUT THE INVENTION

Figure 1A:
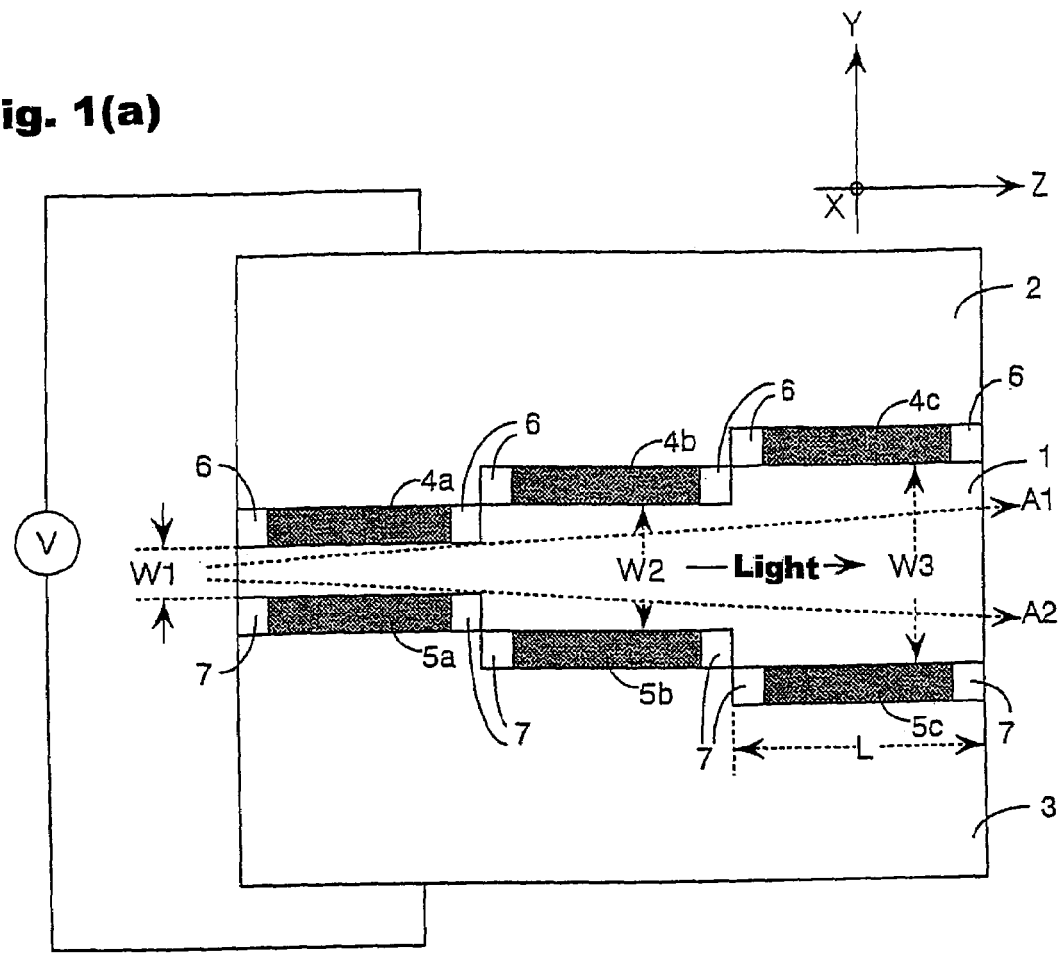
FIGS. 1(a) and 1(b) are structural diagrams of an optical path switching device according to Embodiment 1.

In the following, the present invention will be described in detail, on the basis of the embodiments shown in the drawings. Here, the present invention is not limited to these embodiments.

In addition, in the following embodiments, a light transmitting portion which is a member for switching the optical path of the incident light is referred to as "crystal material portion".

(Embodiment 1)

<Device Configuration>

Figure 1B:
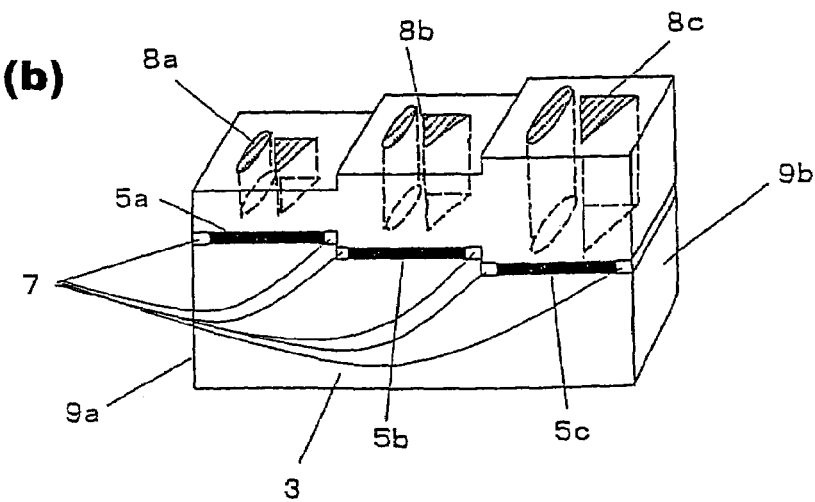

First, one embodiment of the present invention will be described with reference to FIGS. 1(a) and 1(b). FIG. 1(a) is a side diagram of an optical path switching device 101, and FIG. 1(b) is a perspective diagram showing a portion of the optical path switching device 101 that is below a crystal material portion 1.

In FIG. 1(a), the optical path switching device 101 of the present invention is formed of the crystal material portion 1, a first support member 2, a second support member 3, first electrode layers 4a, 4b and 4c, second electrode layers 5a, 5b and 5c, first adhesive layers 6 and second adhesive layers 7. In the case where the first support member 2 and the second support member 3 are made of a conductive material, a voltage V for modulating a refractive index is applied between the upper surface of the first support member 2 and the lower surface of the second support member 3.

The crystal material portion 1 is formed in a manner where the front surfaces and the rear surfaces are symmetrical and in step form. The first support member 2 and the second support member 3 have surfaces which correspond to and can be joined to the front surfaces and the rear surfaces, respectively, of the crystal material portion 1, and are joined to the crystal material layer 1 via the first adhesive layers 6 and the second adhesive layers 7, respectively.

In addition, the first electrode layers 4a to 4c are respectively placed on the surfaces in step form between the crystal material portion 1 and the first support member 2, while the second electrode layers 5a to 5c are respectively placed on the surfaces in step form between the crystal material portion 1 and the second support member 3. That is, the first and second electrode layers are respectively formed of plural portions which are physically separated from each other.

In such an optical path switching device 101, diverging light enters the left side in FIG. 1(a), and is emitted from the right side in FIG. 1(a). The light that has entered into the crystal material portion 1 propagates in the direction from left to right on the plane of the paper so as to diverge. An area within a range shown by segments A1 and A2 in FIG. 1(a) represents a ray bundle.

The first electrode layers 4a to 4c and the second electrode layers 5a to 5c are attached via the first adhesive layers 6 and the second adhesive layers 7 to the first support member 2 and the second support member 3 of which the thickness changes in step form, in such a manner that the first electrode layers 4a to 4c fill portions of the first support member 2 where the first electrode layers 4a to 4c are to be formed and the second electrode layers 5a to 5c fill portions of the second support member 3 where the second electrode layers 5a to 5c are to be formed. Herein, the first support member 2 becomes the position reference of the position of the crystal material portion 1 relative to the optical path switching device 101 itself. Furthermore, the first support member 2 also becomes the positional reference when the optical path switching device 101 is assembled.

The second support member 3 is provided in order to prevent the electro-optic effect property of the crystal material portion 1 from being changed due to a warp in the thin crystal material portion 1. That is, the smaller the thickness of the crystal material portion 1 is, the easier it becomes for a warp to occur in the crystal material portion 1 which is supported only by a single first support member 2, due to a difference in the coefficient of linear expansion between the crystal material portion 1 and the first support member 2. Therefore, the second support member 3 is formed on the side opposite to the first support member 2, so that imbalance in the stress across the top and the bottom of the crystal material portion 1, which becomes a factor of occurrence of a warp, is released. As a result, the occurrence of a warp in the crystal material portion 1 can be prevented.

The crystal material portion 1 is formed of a crystal material (such as $LiNbO_3$ or $LiTaO_3$) having an electro-optic effect. A plurality of refractive region groups 8a to 8c (the respective refractive region groups are formed of a plurality of portions in lens form and a plurality of portions in prism form, though they are represented as a single figure in the drawing), of which the refractive indexes can be controlled through the application of a voltage, are formed in the crystal material portion 1, as shown in FIG. 1(b). The portions in lens form of each region group are for wave front conversion, and the portions in prism form are for angle modulation.

The length L of each surface in step form where each one of the refractive region groups 8a to 8c is formed in the direction from left to right on the plane of the paper of FIG. 1(a) is, for example, approximately 700 μm.

In addition, the thickness of the refractive region group 8a in the direction from top to bottom on the plane of the paper is $W1=70$ μm, the thickness of the region group 8b is $W2=140$ μm, and the thickness of region group 8c is approximately $W3=200$ μm.

These refractive region groups 8a to 8c are formed by forming ion diffusion regions in lens form, in prism form or the like on the surface of the crystal material portion 1 according to a proton exchange method, and after that, applying a voltage of several tens of kV across the two surfaces of the crystal material portion in an electrolytic solution so as to partially generate a domain inversion structure (polarizations are inverted), and have a structure which is uniform in the direction of the thickness of the crystal material portion 1, that is, in the direction y in the figure.

Furthermore, these refractive region groups can be provided as a plurality of refractive region groups of which the length is as small as less than 100 µm so that light can pass through these refractive region groups, and a large angle modulation effect can be obtained in the optical path switching device 101, even though the optical path switching device 101 is a bulk device.

Figure 2:
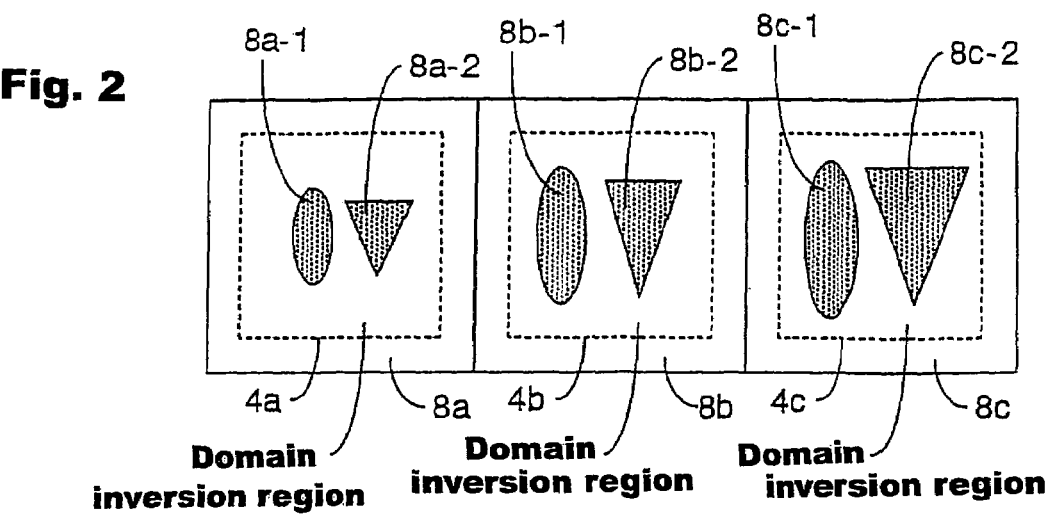
FIG. 2 is a plan diagram of the optical path switching device according to Embodiment 1.

FIG. 2 is a plan diagram showing the crystal material portion 1 of FIG. 1 as viewed from the top.

Ion diffusion regions (8a-1, 8b-1 and 8c-1) in lens form and ion diffusion regions (8a-2, 8b-2 and 8c-2) in prism form are respectively formed in refractive region groups 8a, 8b and 8c, where the size of the ion diffusion regions becomes smaller nearer the entrance side and greater nearer the emission side.

In addition, the regions shown by dotted lines indicate the regions where the electrode layers (4a, 4b and 4c) exist, and these regions become domain inversion regions.

In Embodiment 1, the crystal material portion is formed in such a manner that the thickness of the crystal material portion changes in step form symmetrical relative to the optical axis, as shown in FIG. 1(a), so that the thickness of the crystal material portion can be changed, in order to minimize the driving voltage for obtaining the same refractive effects in refractive regions having the same area in the optical path switching device for diverging light that passes through the optical path switching device. As a result of this, the thickness of the crystal material portion 1 is reduced in accordance with the width (A1 to A2) of the ray bundle in such a manner that useless portions in thickness are relatively reduced.

The advantage of this step structure is that a voltage can be applied to every voltage application portion of the crystal material portion 1 substantially perpendicularly to the optical axis and that a change in the refractive index that is caused by the electro-optic effect can be obtained most effectively from the point of view of voltage application. In addition, the structure that is symmetrical relative to the optical axis is advantageous in making light pass through the crystal material portion 1 without a loss.

The entrance surface 9a and the emission surface 9b of light shown in FIG. 1(b) are formed as polished surfaces of the layered structure, which is formed of the crystal material portion 1, the first support member 2, the second support member 3, the first electrode layers 4a to 4c, the second electrode layers 5a to 5c, the first adhesive layers 6 and the second adhesive layers 7, which are substantially perpendicular to the direction of layering of the layered structure. Here, reflection preventive films may be formed on the entrance surface 9a and emission surface 9b, in order to enhance the transmittance of light in the optical path switching device 101.

<Voltage Application Method>

Next, a method for applying a voltage to this optical path switching device will be described.

FIG. 1(a) shows the voltage application method in the case where the first support member 2 and the second support member 3 are made of a conductive material. As for the conductive material, a conductive epoxy resin of a type into which metal particles have been mixed, an organic silver-based conductive resin of a type into which silver oxide has been mixed, or an iron-based material on which conductive plating has been carried out, for example, can be used.

In the case where the first support member 2 and the second support member 3 are made of a conductive material, the first support member 2 and the second support member 3 serve as external electrodes, and a voltage V is directly applied across these two support members, as shown in FIG. 1(a). As a result of this, modulation of the refractive index in refractive regions 8a to 8c of the optical path switching device 101 can be implemented without separately providing external electrodes.

In this case, the voltage V that is applied between each pair of the electrodes of refractive region groups 8a to 8c is the same; therefore, the electrical field varies in accordance with the thickness of each region group. For example, the intensity of the electrical field across the refractive region group 8a of which the thickness is smaller than any other refractive regions becomes the highest.

Figure 3:
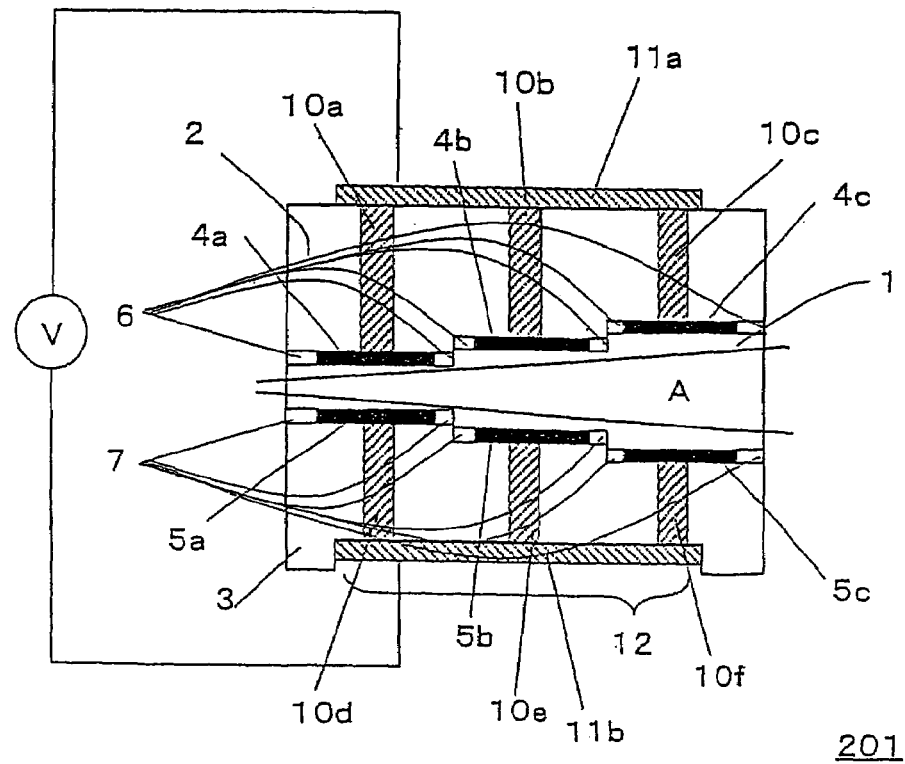
FIG. 3 is a cross sectional diagram of the optical path switching device according to Embodiment 1.

Next, FIG. 3 shows an electrode configuration in the case where the first support member 2 and the second support member 3 are not made of a conductive material.

In this case, as shown in an optical path switching device 201 of FIG. 3, contact holes 10a to 10c and 10d to 10f are created inside of the first support member 2 and the third support member 3, and a conductive material (a conductive epoxy resin of a type into which metal particles have been mixed, an organic silver-based conductive resin of a type into which silver oxide has been mixed or the like) is filled into the contact holes 10a to 10f.

In addition, external electrodes 11a and 11b are provided on the surfaces which are different from the surfaces where the first support member 2 and the second support member 3 make contact with the crystal material portion 1. Al electrodes or the like are used for the external electrodes 11a and 11b.

This external electrode 11a and each of the first electrode layers 4a, 4b and 4c are electrically connected via the conductive material of the contact holes 10a, 10b and 10c.

In addition, the external electrode 11b and the second electrode layers 5a, 5b and 5c are electrically connected via the conductive material of the contact holes 10d, 10e and 10f.

The voltage V is applied across the external electrodes 11a and 11b and, thereby, this voltage is applied to each of the refractive regions 8a, 8b and 8c, so that modulation in the refractive index can be carried out.

According to this voltage application method, leakage of a current or the like due to the voltage application needs not be worried about; therefore, this method is effective in the case where it is necessary to make a side of the optical path switching device contact with a member made of a metal.

Here, though in FIG. 3, a configuration is provided where the contact holes 10a to 10c are collectively provided to the single external electrode 11a and the contact holes 10d to 10f are collectively provided to the single external electrode 11b, leads may be individually connected to the electrodes so that different voltages can be applied to these individual electrodes in the configuration. As a result of this, the electrical field that is generated between each pair of electrodes in the refractive region groups 8a to 8c can be made constant.

Herein, the places where the external electrodes 11a and 11b are placed and the method for forming the external electrodes 11a and 11b are not greatly restricted in the optical path switching device 201. In the case where an external electrode is formed on an assembly surface side of the optical path switching device 201, however, the structure where, as show in FIG. 2, the external electrode 11b is arranged in a trench 12 that is provided on the assembly surface side is preferable at the time of assembly, from the point of view of providing advantages by flattening the assembly surface and arranging electrode portions in a lower position so that even metal surfaces can be arranged.

Figure 4:
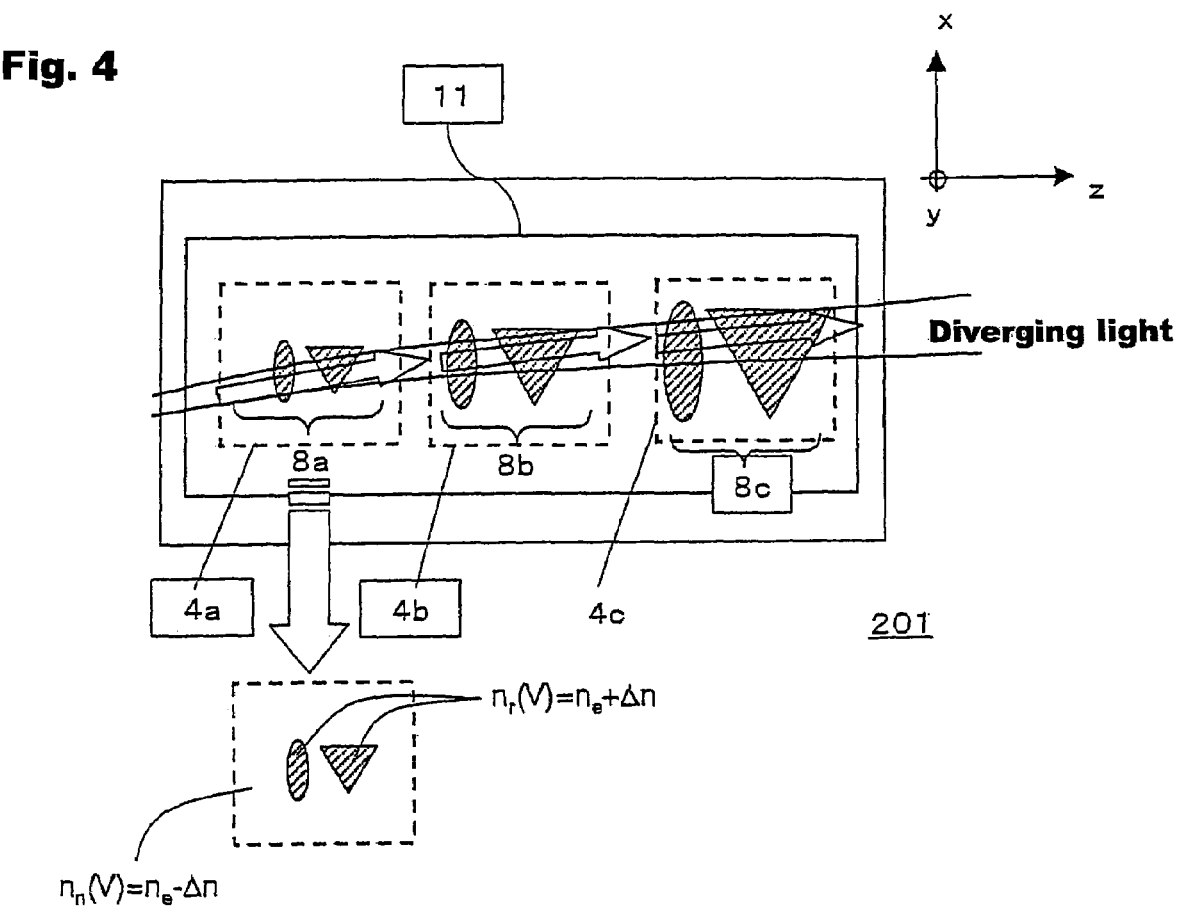
FIG. 4 is a diagram showing the course of light at the time of voltage application in the optical path switching device according to Embodiment 1.

FIG. 4 is a schematic diagram showing the course of light passage at the time of voltage application according to Embodiment 1.

FIG. 4 is a diagram showing the configuration of FIG. 1(b) as viewed from the top.

In the case where the same voltage V is applied to each of the electrodes 4a to 4c, a portion where domain inversion has occurred exhibits a change Δn in the refractive index having the same value as that and having the polarity opposite from that of the change Δn in the refractive index exhibited by the surrounding, and $n_n(V)=n_e-\Delta n$, and $n_r(V)=n_e+\Delta n$ are given. Herein, ne is the refractive index when the voltage is 0 V. In addition, $n_n$ is the refractive index outside of the refractive region, and $n_r$ is the refractive index within the refractive region. As a result of this, diverging light is refracted so as to have a vector in the direction of the xz plane (shown by arrows in the figure) in the refractive regions 8a to 8c, as shown in the figure. Here, for example, the thinner the crystal material portion 1 is, the greater the change in the refractive index becomes, relatively, for the same voltage V. Therefore, the refractive angles in the prism type refractive regions exhibiting a light deflection function have the relationship of $\phi_a>\phi_b>\phi_c$, where $\Phi_a$, $\Phi_b$ and $\Phi_c$ (not shown) are the respective refractive angles of light in the refractive regions seen from the entrance side of FIG. 4, and the thinner the crystal material portion is, the greater the degree of bend in light becomes, relatively for the same applied voltage V. That is, light bends most in the refractive region 8a, and light bends least in the region 8c.

<Manufacturing Method>

Next, a manufacturing process for the optical path switching device 101 shown in FIG. 1 will be described.

FIGS. 5 and 6 show the manufacturing process for the optical path switching device according to Embodiment 1 of the present invention. Here, in FIGS. 5 and 6, for the purpose of simplifying the description, the first adhesive layers 6 and the second adhesive layers 7, which are located in the portions where the first electrode layers 4 and the second electrode layers 5 are not formed, respectively, are omitted.

Step 1: (FIG. 5(a))

First, the crystal material portion 1 on which the refractive region groups 8 have been formed according to the above-described method is placed on and secured to a temporary support member 50 for reinforcement.

Herein, reinforcement means to protect the crystal material portion 1 so that no warp occurs in the crystal material portion 1 when it is processed into step form. As for the material of the temporary support member 50, for example, a metal plate such as an Al plate can be used.

Step 2: (FIG. 5(b))

Next, an exposed surface 51 of the crystal material portion 1 is processed into step form (13a, 13b and 13c). A polishing jig, for example, having a step form that is opposite to the step form of the surfaces of FIG. 5(b) may be prepared in advance, and this jig is slid in the direction perpendicular to the direction in which steps are formed, and thereby, the surface 51 is polished and processed, and at the same time, the surfaces in the form of a number of steps are formed.

Alternatively, a polishing jig having a feeding mechanism with a high precision may be used, so that polishing is carried out while shifting the part to be polished, and thereby, the surfaces in step form (13a, 13b and 13c) may be polished one by one. The depth of polishing may be adjusted by changing the time for polishing.

As a result of this step, the refractive region groups 8a to 8c, as shown in FIG. 1(b), are formed. The step between the surfaces 13a and 13b in step form and the step between the surfaces 13b and 13c are approximately 30 μm to 50 μm.

Here, though FIG. 5(b) shows a step form where three steps (13a, 13b and 13c) are repeated, the number of steps is not limited to this, and the number of steps may be increased, depending on specifications required for the optical path switching device.

Step 3: (FIG. 6(a))

First, the first electrode layers 4 (4a, 4b and 4c) are formed on the surfaces (13a, 13b and 13c) in step form. The portions where these first electrode layers 4 are formed become domain inversion regions in the refractive region groups 8.

As for the material of the first electrode layers 4, for example, Al or the like can be used. In addition, the first electrode layers 4 may be formed, for example, by forming electrode forms utilizing a mask in desired electrode form, and by lifting off the unnecessary portions using, for example, photolithography.

Next, an acryl-based adhesive is applied as the first adhesive layers 6 (not shown) to the structure of the surfaces in step form where the first electrode layers 4 have been formed, and this structure and the first support member 2 are made to adhere to each other in such a manner that the surfaces of both make close contact with each other.

Here, one surface of the first support member 2 has been polished and processed in advance into a form that is opposite to the form of the step surfaces (13a, 13b and 13c).

Step 4: (FIG. 6(b))

Herein, the temporary support member 50 is removed, and the repeating step surfaces (54a, 54b and 54c) similar to the step surfaces (13a, 13b and 13c) are formed on the other surface 52 of the crystal material portion 1, using the same method as in Step 2.

At this time, the first support member 2 is fixed as the position reference for processing, and then the surface 52 is polished so that the step surfaces 13a and 54a, 13b and 54b, as well as 13c and 54c, correspond to each other in the vertical direction.

Step 5: (FIG. 6(c))

Herein, the second electrodes (5a, 5b and 5c) are formed on the surfaces (54a, 54b and 54c) in step form, in positions that correspond in the vertical direction to the first electrode layers (4a, 4b and 4c) that have been formed in Step 3, according to the same method as that of Step 3.

Next, the second support member 3 that has the surfaces which have been processed in advance into a form that engages with the surfaces (54a, 54b and 54c) in step form is made to adhere to the crystal material portion 1 via the second adhesive layers 7.

As a result of the above-described steps, the optical path switching device 101 where a plurality of layered structures as shown in FIG. 6(c) are sequentially formed is formed.

Furthermore, the layered structure in repeating step form is cut using, as a cutting reference, end portions of the repeating structure of step forms, in order to obtain the structure in step form where three steps are one unit of the repeating structure in step form, as shown in FIG. 1(a).

As a result of this, plural optical path switching devices 101 are separated from each other.

In addition, the two end surfaces, left and right, of a structure that has been cut are polished to form the entrance surface 9a and the emission surface 9b of FIG. 1(b).

Furthermore, the layered structure is cut so that a predetermined width is given between the sides of the layered structure which in the plane of the paper in FIG. 6(c) are the front side and the back side and which are perpendicular to the entrance surface and the emission surface of the layered structure. Thus, the optical path switching device 101 as shown in FIG. 1(a) is completed.

According to this manufacturing procedure, a plurality of optical conversion devices 101 which have a crystal material portion 1 having a structure in step form which is symmetrical relative to the optical axis can be simultaneously manufactured without forming a discontinuous portion in the crystal material portion 1 itself.

(Embodiment 2)

<Device Configuration>

Figure 7A:
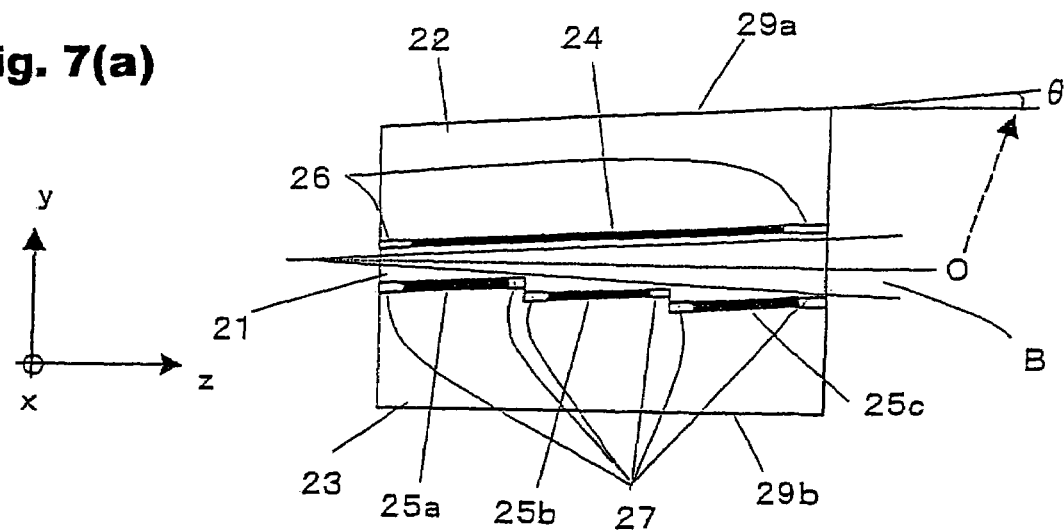
FIGS. 7(a) and 7(b) are structural diagrams of an optical path switching device according to Embodiment 2.
Figure 7B:
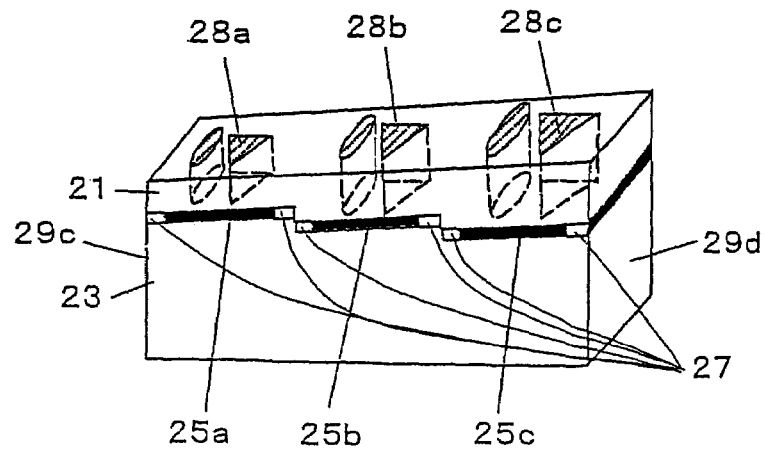

FIGS. 7(a) and 7(b) are diagrams showing the structure of an optical path switching device according to Embodiment 2 of the present invention.

FIG. 7(a) is a cross sectional diagram of the optical path switching device as viewed from the side, and FIG. 7(b) is a perspective diagram of the optical path switching device, from which the first support member 22, which is the upper portion of the device, has been removed.

The optical path switching device 102 of Embodiment 2 is formed of a crystal material portion 21, a first support member 22, a second support member 23, a first electrode layer 24, second electrode layers 25 (25a, 25b and 25c), first adhesive layers 26 and second adhesive layers 27.

In Embodiment 2, only the surfaces on one side of the crystal material portion 21 are in step form, and the thickness varies in the structure. The surface on the other side is a flat surface having no steps. In addition, as shown in FIG. 7(b), refractive region groups 28a, 28b and 28c, which are similar to those in FIG. 1(b), are formed.

In this crystal material portion 21, the single first electrode layer 24 is formed on the flat side, and the second electrode layers 25 (25a, 25b and 25c), which are separated into three portions, are formed on the side in step form. The first support member 22, which has the process reference surface 29a to be used at the time of the formation of the step form, is made to adhere via the first adhesive layers 26 on the first electrode layer 24 side of the crystal material portion 21.

In addition, on the second electrode layers 25 (25a, 25b and 25c) side of the crystal material portion 21, the second support member 23, which prevents the occurrence of a warp in the thin crystal material portion 21 and at the same time on which a position reference portion 29b to be used at the time of the assembly of the optical path switching device 102 is formed is made to adhere to the crystal material portion 21 via the second adhesive layers 27, as in the case of optical path switching device 101. Herein, the second adhesive layers 27 are formed so as to fill the gaps between the second electrode layers 25. In addition, the surface of the second support member 23 on the second electrode layer 25 side has a step structure that corresponds to the step structure of the crystal material portion 21, while the other surface 29b is flat, serving as the position reference.

The optical path switching device of Embodiment 2 having such a structure also carries out a sufficient optical path switching function for practical use, and the manufacturing process for this can be simplified, as described below.

In the optical path switching device (102) of Embodiment 2, as shown in FIG. 7, the incident light propagates in the direction that is inclined by a predetermined angle θ relative to the reference surface 29a, and the direction of the propagation of light is gradually bent by applying a voltage, and the light passes through the structure in step form of the crystal material portion 21 without any obstacles, so as to emit from the emission surface 29d.

Accordingly, the entrance surface 29c and the emission surface 29d are formed as the end surfaces which are perpendicular to the center line O of the incident light B in order to maximize the transmittance of light in the optical path switching device (102). As a result of this, 29b, which also serves as the position reference of the second support member 23, is formed so as to be perpendicular to the respective entrance surface 29c and emission surface 29d.

In such a configuration, the second support member 23 (or 20) is not merely for the prevention of a warp in the crystal material portion 21, but can also serve as the position reference of the optical path switching device to be used at the time of assembly of the device in the condition where light diagonally passes through the crystal material portion, and this position reference can be formed independently of the center line O which indicates the direction of light that passes through the crystal material portion 21.

This structure is slightly more disadvantageous than that of the optical path switching device 101, considering the object, which is for light to pass on the best course through the crystal material portion 21, whereas this structure enables one of the first support member 21 and the second support member (23 and 20) to be used for the position reference and enables the other to be used for the formation reference of the thin crystal material portion 21 where the thickness varies in step form, and thus, enables the respective support members to be utilized flexibly and efficiently.

<Manufacturing Method>

Figure 8A:
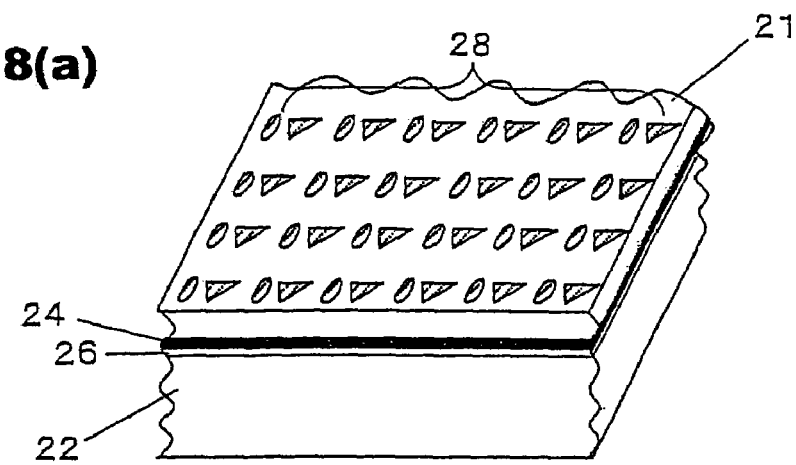
FIGS. 8(a) to 8(c) are diagrams showing a manufacturing method for the optical path switching device according to Embodiment 2.
Figure 8B:
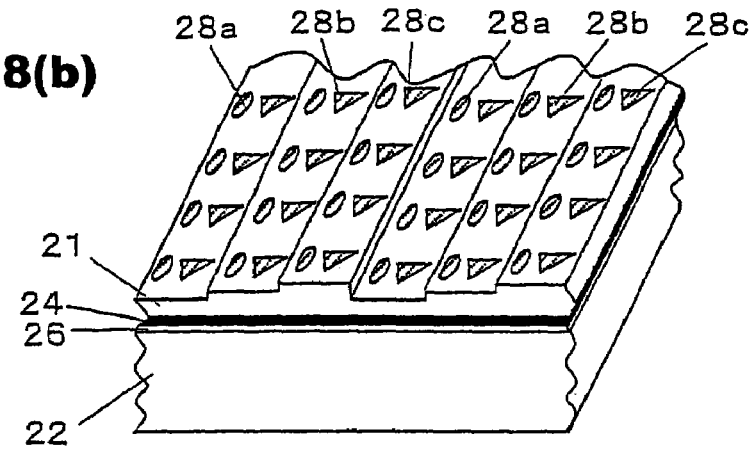
Figure 8C:
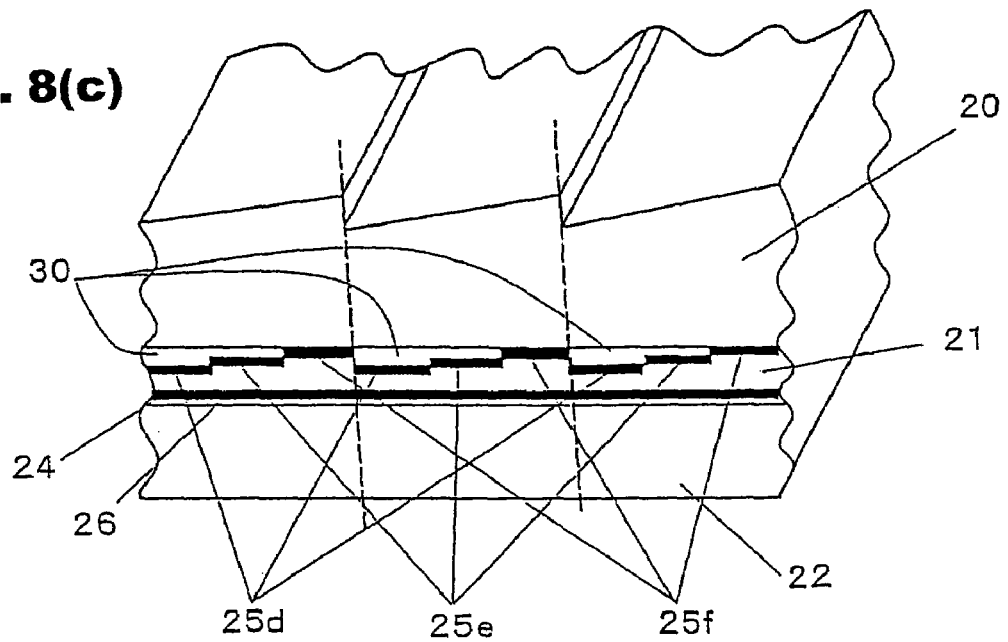

Next, FIGS. 8(a) to 8(c) show a manufacturing method for this optical path switching device 102 of Embodiment 2. According to this manufacturing method, the temporary support member 50 that is used in Embodiment 1 is unnecessary. That is, it is not necessary to fabricate in advance a member that is not utilized in the completed device, and therefore, the manufacturing cost and labor can be reduced, and in this sense, efficient manufacturing becomes possible.

First, in FIG. 8a, the first support member 22, of which the two surfaces are flat, and the crystal material portion 21, on which refractive region groups 28 have been formed as is the case with the crystal material portion 1 shown in FIG. 5(a), are prepared.

The first electrode layer 24 is formed on the entirety of one surface of this crystal material portion 21. Then, the first adhesive layer 26 is formed on this first electrode layer 24, and is made to adhere to one of the flat surfaces of the first support member 22.

Next, as shown in FIG. 8(b), the surface of the crystal material portion 21 on which the first electrode layer is not formed is polished and processed into step form. This polishing and processing may be carried out in the same manner as in Embodiment 1. Though in FIG. 8(b), the surface structures (28a, 28b and 28c) in three steps are repeated in the configuration, the number of steps is not limited to this.

Next, by the same method as that used in Embodiment 1, the second electrode layers 25*d*, 25*e* and 25*f* are formed on the step structures (28*a*, 28*b* and 28*c*) formed in FIG. 8(*b*).

The second support member 20 has been formed in advance as a member having a surface in serrated form that is to serve as the reference of the below described cutting, as well as a flat surface. Then, the second support member 20 having the surface in serrated form of which the repetition period corresponds to the size of the optical path switching device is attached as shown in FIG. 8(*c*) via the second adhesive layers 30, so that the end portions of the surfaces 28*a* in step form coincide with the end portions of the surfaces in serrated form.

Next, this is cut into bars based on the repeating portions in serrated form along the broken lines in the figure, and the cut surfaces of the bars are polished into entrance surfaces 29*c* and emission surfaces 29*d*. Finally, each of these bars is cut in the direction perpendicular to the polished surfaces, and thus, the optical path switching device 102 can be manufactured.

According to the above-described manufacturing procedure, the optical path switching devices can be efficiently manufactured in comparison with those of Embodiment 1.

(Embodiment 3)

An optical path switching device where the thickness of the crystal material portion from the entrance side to the emission side varies in so-called taper form will be described below.

Figure 9A:
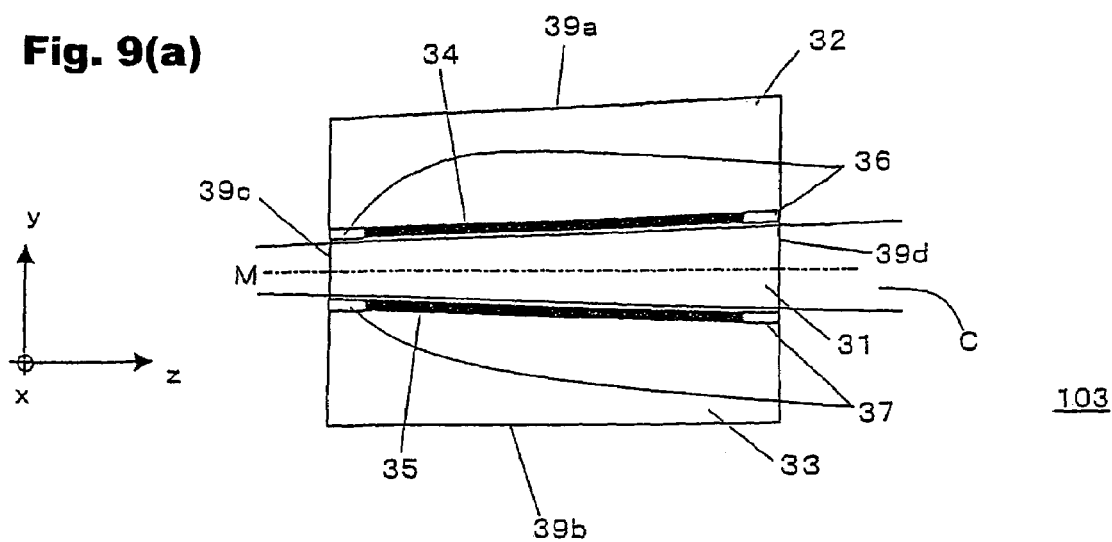
FIGS. 9(a) and 9(b) are structural diagrams of an optical path switching device according to Embodiment 3.
Figure 9B:
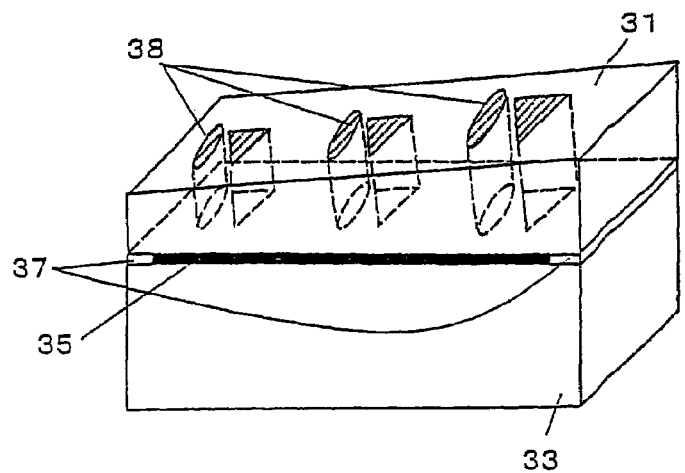

FIGS. 9(*a*) and 9(*b*) are a cross sectional diagram of the optical path switching device of Embodiment 3 and a perspective diagram showing a portion of the device from which the first support member 32 has been removed.

In FIG. 9(*a*), the length of the crystal material portion 31 on the entrance surface 39*c* side in the direction from the top to the bottom in the plane of the paper is 70 μm, the length of the crystal material portion 31 on the emission surface 39*d* side in the direction from the top to the bottom in the plane of the paper is 200 μm, and the surfaces of the crystal material portion 31 that face the first support member 32 and the second support member 33 are both formed as flat surfaces.

In addition, refractive region groups 38 which are the same as in the previous embodiment are formed inside the crystal material portion 31.

In addition, a first electrode layer 34 is formed on one surface so as to cover the refractive region groups 38 of the crystal material portion 31, and a second electrode layer 35 is formed on the surface on the side opposite to the first electrode layer 34. The first support member 32 is made to adhere to this electrode layer 34 side via first adhesive layers 36, and the second support member 33 is made to adhere to the second electrode layer 35 side via second adhesive layers 37.

Herein, light C is made to enter the optical path switching device 103 in such a manner that the optical axis of diverging light C coincides with the center line M of the taper form, so that the light passes through the crystal material portion 31 in the device with the least possible amount of loss. Accordingly, it is preferable for the entrance surface 39*c* and the emission surface 39*d* of the device to be formed so as to be approximately perpendicular to this center line M.

In addition, as in the case with Embodiment 1, the second support member 33 can be utilized for the formation of the position reference. Herein, the second support member 33 is formed so that the surface 39*d* of the second support member 33 on the side that does not make contact with the second electrode layer 37 is parallel to the center line M. This surface 39*b* serves as the position reference at the time of the assembly of the optical path switching device 103 of Embodiment 3.

The crystal material portion 31 is in taper form, and therefore, the first electrode layer 34 and the second electrode layer 35 do not form parallel planes. However, it is possible to design the taper form of the crystal material portion 31 so that it corresponds to the manner where diverging light C spreads, in order to obtain the maximum degree modulation in each position of the diverging light C in the direction in which it propagates through this crystal material portion 31.

Figure 10A:
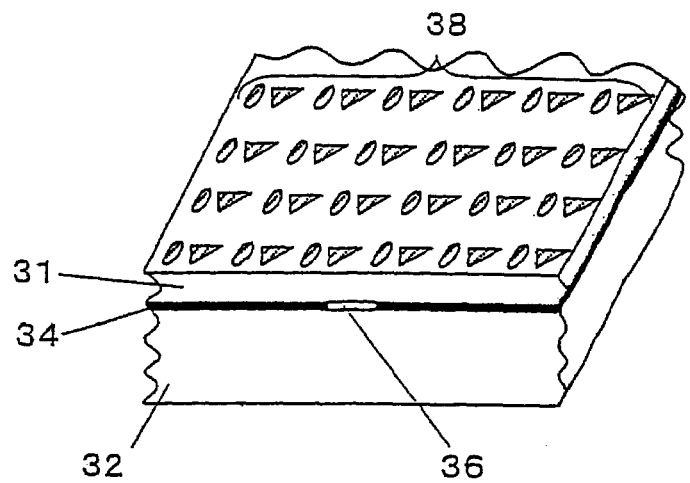
FIGS. 10(a) to 10(c) are diagrams showing a manufacturing method for the optical path switching device according to Embodiment 3.
Figure 10B:
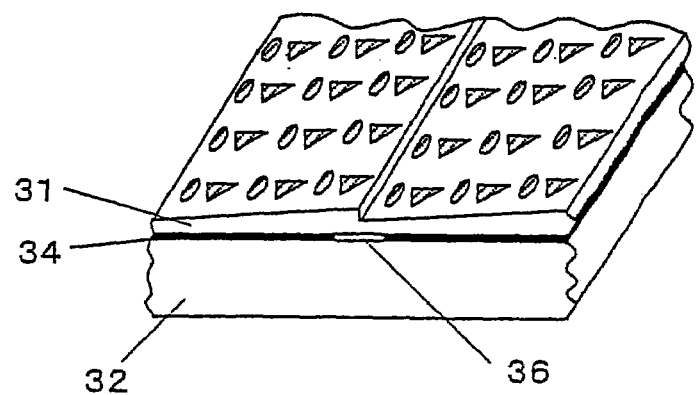

FIG. 10 shows a manufacturing method for the optical path switching device of Embodiment 3.

First, the first support member 32 of which the upper surface and the lower surface are flat, and the crystal material portion 31 in which the refractive region groups 38 have been formed and which has the upper surface and the lower surface parallel to each other are prepared.

In FIG. 10(*a*), the first electrode layers 34 are formed on one surface of the crystal material portion 31, one first electrode layer 34 for each unit of the device of FIG. 10(*a*), a region in which three refractive region groups 38 have been formed being one unit. That is, the first electrode layers 34 are formed so that gap regions for the formation of first adhesive layers 36 can be provided in portions of the border between units of the device.

Then, as shown in FIG. 10(*a*), the crystal material portion 31, on which the first electrode layers 34 are formed, and the first support member 32 are made to adhere to each other via the first adhesive layers 36.

Next, as shown in FIG. 10(*b*), the surface of the crystal material portion 31 on which the first electrode layers 34 have not been formed is processed into in taper form, using the surface 39*a* of the first support member 32 as the processing reference. Herein, the surface of the crystal material portion 31 is processed so as to have a structure where a taper portion is repeated for each of the optical path switching devices, as shown in FIG. 10(*b*). Processing into taper form may be carried out by using a cutting tool for polishing into taper form which is slid in the direction perpendicular to the taper formation.

Next, as shown in FIG. 10(*c*), after the formation of the second electrode layers 35 on the surface of the crystal material portion 31 on the side where the repeating taper structure has been formed, the second support member is attached via the second adhesive layer 37.

Herein, taper portions having approximately the same inclination as the inclination of the taper portions of crystal material portion 31 have been formed in advance on the surface of the second support member 33 on the side that makes contact with the second electrode layers 35, and taper portions having an inclination that is approximately half the inclination of the above-described taper portions have been formed on the surface on the side that does not make contact with the second electrode layers 35. The inclination of the taper portions of the second support member 33 is approximately half the inclination of the crystal material portion, because at this inclination, light can be made to enter the taper portions at an ideal angle when the crystal material portion is cut along the surfaces perpendicular to the inclination of the surface of the second support member.

In this a case, as shown in FIG. 10(*c*), the second support member 33 is made to adhere to the crystal material portion 31 in such a manner that the second adhesive layers 37 fill in the gaps between the second electrode layers 35.

Figure 10C:
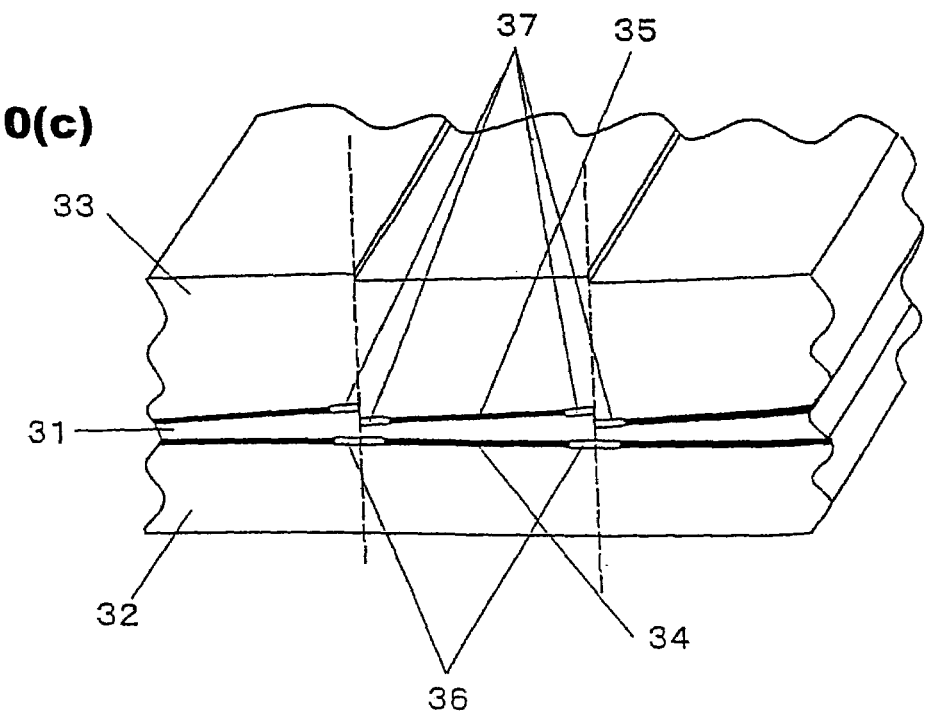

Next, this is cut into bars along the broken lines of FIG. 10(c) on the basis of the units of repeating taper structures on the surfaces of the second support member 33.

After this, these bars are polished so as to form these cutting surfaces into the entrance surfaces 39c and the emission surfaces 39d of the optical path switching devices, and finally, each of these bars is cut in the direction perpendicular to the polishing surfaces, in order to complete the optical path switching device 103.

According to Embodiment 3, the crystal material portion 31 is formed so as to have surfaces in taper form, and therefore, the maximum degree of modulation can be obtained in each position along the direction in which light propagates, and a great number of optical path switching devices can be simultaneously and efficiently manufactured, according to a relatively easy method.

(Function of Optical Path Switching Device)

Next, the functions common to the optical path switching devices of the above-described three embodiments will be described.

(A) Aperture Restricting Function

The aperture restricting function means a function of restricting a region of the crystal material portion from which emission light is emitted.

Figure 11:
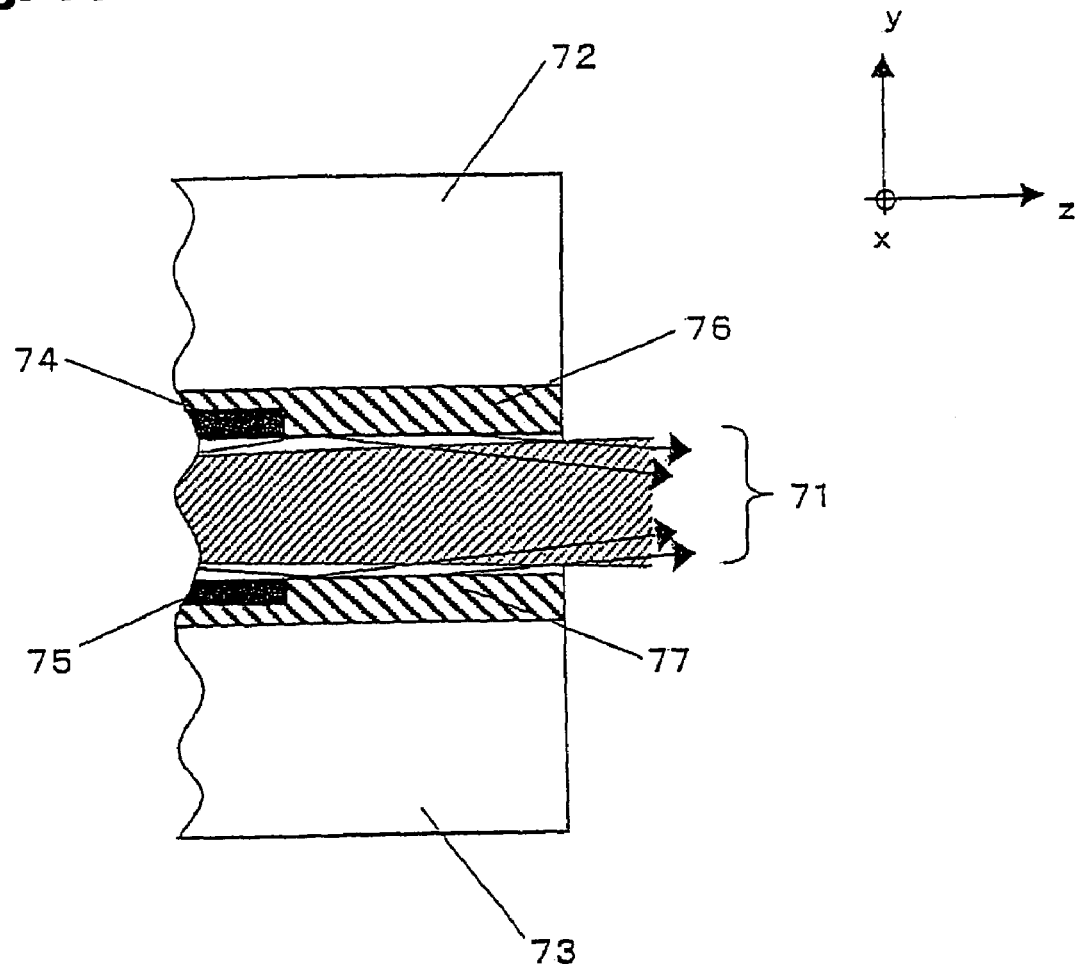
FIG. 11 is a diagram showing the course of light emitted from the optical path switching device.
Figure 13A:
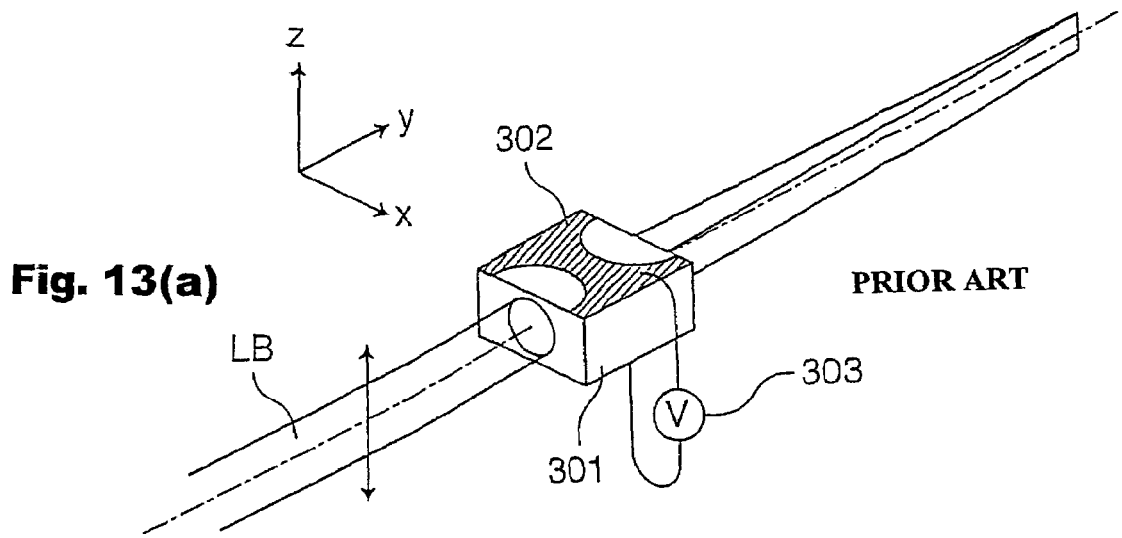
FIG. 13 is a perspective diagram showing a conventional optical path switching device.
Figure 13B:
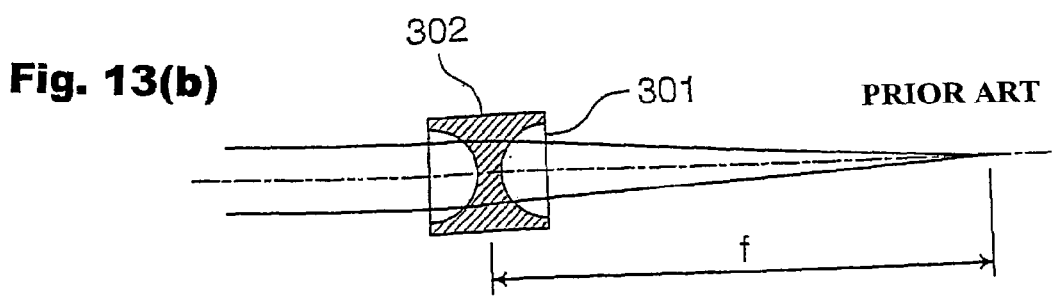
Figure 14:
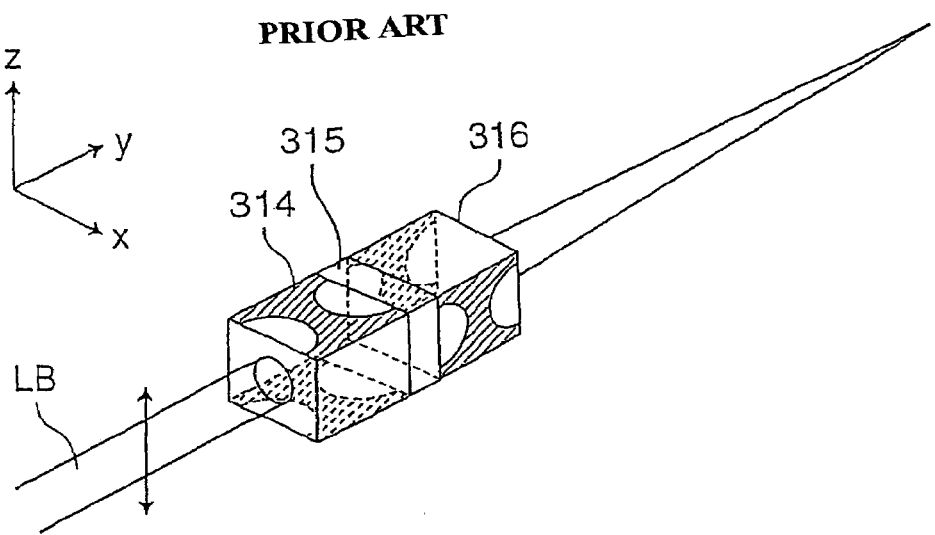
FIG. 14 is a perspective diagram showing the conventional optical path switching device.

FIG. 11 is an enlarged diagram showing a portion, from which emission light is emitted, of the optical path switching device shown in FIG. 1. Herein, reference numeral 71 corresponds to the crystal material portion 1, reference numeral 72 corresponds to the first support member 2, reference numeral 73 corresponds to the second support member 3, reference numeral 74 corresponds to the first electrode layer 4c, reference numeral 75 corresponds to the second electrode layer 5c, reference numeral 76 corresponds to the first adhesive layer 6, and reference numeral 77 corresponds to the second adhesive layer 7.

In FIG. 11, the first adhesive layer 76 and the second adhesive layer 77 fulfill the role as an aperture restricting portion for suppressing the spread of the diverging light that has propagated through the crystal material portion 71.

Therefore, the emission light is emitted so as not to spread in the direction above the first adhesive layer 76 and in the direction below the second adhesive layer 77.

At this time, unnecessary light to be restricted by the aperture hits the interface between the crystal material portion 71 and the first adhesive layer 76, the interface between the crystal material portion 71 and the first electrode layer 74, the interface the crystal material portion 71 and the second adhesive layer 77, as well as the interface between the crystal material portion 71 and the second electrode layer 75 before reaching the emission surface. Herein, in the case where the above-described interfaces are mere mirrors, the light is reflected again into the crystal material portion 71 so as to reach the end for light emission, and this becomes stray light.

That is, the existence of the aperture restricting function enhances the probability of the occurrence of stray light, and in the case where the aperture restricting function is added, the occurrence of stray light cannot be prevented solely by blocking light at the emission surface.

Therefore, the first electrode layer 74, the second electrode layer 75, the first adhesive layer 76 and the second adhesive layer 77 are respectively provided with light absorbing properties. As a result of this, the reflection from the above-described interfaces shown by arrows in FIG. 11 can be reduced in the interfaces formed with the crystal material portion, and consequently, stray light that is mixed in emission light can be reduced. In order to provide these layers with light absorbing properties, the surfaces which are hit by light can, for example, be made black.

(B) Wave Front Conversion Function

The wave front conversion function means a function of suppressing the spread of diverging light that is to enter the device.

Though the surface 9a which light enters is processed into a flat surface in the device shown in FIG. 1 and other figures of Embodiment 1, it is not necessarily required to process the surface into a flat surface in order to increase the degree of freedom in the angle modulation for optical path switching.

In general, the longer the distance for light to pass through the optical path switching device is, the greater the degree of angle modulation becomes.

Therefore, the entrance surface 9a is processed so that the optical path switching device has a wave front conversion function, in order to increase the degree of angle modulation. As shown in FIG. 12, for example, in the case where the entrance surface 9a is processed into a curved surface form (80), the distance of light propagation within the device can be increased.

FIG. 12 shows the optical path switching device 102 shown in FIG. 7 of Embodiment 2, of which the entrance surface 29c has been processed into a curved surface form (80).

It can be seen from FIG. 12 that the optical path is changed at the entrance surface of the device, and therefore, the degree of divergence (diverging angle) of light that has entered the optical path switching device can be reduced by providing the curved surface form 80 to the entrance surface.

In the case where the diverging angle is made small, as described above, the length of a flat portion of light becomes great even though the thickness of the three step structure is the same in the crystal material portion 81, and therefore, the distance of light propagation through the optical path switching device can be increased, in comparison with the case where the entrance surface is simply a flat surface. That is, the degree of angle modulation while light passes through the optical path switching device can be increased.

(Effects of the Invention)

According to the present invention, a crystal material portion that has different thicknesses in the direction in which light propagates and that has reflective regions is provided, and two support members are made to adhere to the two sides of this crystal material portion, and therefore, a warp in the crystal material portion can be prevented, the position reference for the manufacture of the device can be clearly formed, and a plurality of devices can be simultaneously manufactured easily and efficiently.

In addition, according to the present invention, the crystal material portion is formed so that one surface thereof varies in step form, and therefore, the first support member or the second support member can be used as the position reference at the time of manufacture of this device, and thus, the optical path switching device can be easily manufactured without using a temporary support member at the time of manufacture.

In addition, according to the present invention, the crystal material portion is in taper form, and therefore, an appropriate change in the refractive index of the incident light can be obtained.

Furthermore, the repeating structure of step forms or taper forms is formed in the crystal material portion, and the repeating structure in serrated form is formed in the second support member, and thereby, it becomes possible to simultaneously manufacture a plurality of optical path switching devices efficiently.

The invention claimed is:

1. An optical path switching device comprising a light transmitting portion where a plurality of refraction regions are formed so that the refractive index of light can be controlled uniformly in a direction perpendicular to a direction in which light propagates by using an electro-optic effect, the thickness of the light transmitting portion varying along the direction in which light propagates, a first electrode layer and a second electrode layer which are formed so as to sandwich the light transmitting portion and cover at least the portions of the refractive regions, a first support portion which is placed so as to make close contact with the first electrode layer via a first adhesive layer on a side that does not make contact with the light transmitting portion, and a second support portion which is placed so as to make close contact with the second electrode layer via a second adhesive layer on a side that does not make contact with the light transmitting portion.

2. The optical path switching device according to claim 1, wherein the light transmitting portion has an entrance surface and an emission surface which are approximately perpendicular to the direction in which light propagates, and the thickness of the light transmitting portion varies substantially symmetrically relative to an optical axis of light in such a manner as to increase in step form nearer the emission surface, the light entering approximately perpendicularly the entrance surface.

3. The optical path switching device according to claim 1, wherein the light transmitting portion has an entrance surface and an emission surface which are approximately perpendicular to the direction in which light propagates and wherein the thickness of the light transmitting portion in the direction perpendicular to the direction in which light propagates varies in such a manner as to increase in step form nearer the emission surface, and while one of electrode-formed surfaces varies relative to an optical axis of light that enters approximately perpendicularly the entrance surface, the other electrode-formed surface is formed as a plane without steps.

4. The optical path switching device according to claim 1, wherein the light transmitting portion has an entrance surface and an emission surface which are approximately perpendicular to the direction in which light propagates, and the thickness of the light transmitting portion in the direction perpendicular to the direction in which light propagates varies in such a manner as to increase in taper form nearer the emission surface.

5. The optical path switching device according to any of claims 1 to 4, wherein the light transmitting portion is formed of a crystal material that has an electro-optic effect through application of a voltage.

6. The optical path switching device according of any of claims 1 to 4, wherein the first electrode layer and second electrode layer are each formed of either a single body or portions which are physically separated from each other.

7. The optical path switching device according to any of claims 1 to 4, wherein the first support portion and the second support portion are each formed of a conductive material.

8. The optical path switching device according to any of claims 1 to 4, wherein the first support portion and the second support portion are each formed of an insulating material having at least one through hole, a first external electrode is formed on a surface of the first support portion which does not make contact with the light transmitting portion, a second external electrode is formed on a surface of the second support portion which does not make contact with the light transmitting portion, and the first electrode layer and the first external electrode are conductively connected to each other as well as the second electrode layer and the second external electrode are conductively connected to each other, each of the connections being made through said at least one through hole.

9. A manufacturing method for the optical path switching device according to claim 2, comprising the steps of: making a light transmitting portion adhere to a temporary support member, the light transmitting portion having refractive regions; processing a surface of the light transmitting portion opposite to the temporary support member side into a first repeating structure in step form; forming a first electrode layer on the first repeating structure; making a first support portion adhere to the light transmitting portion via a first adhesive layer, the first support portion having a surface that makes contact with the first electrode layer and that has been processed into a second repeating structure in step form, the adhesion being made so that the first and second repeating structures are joined to each other; removing the temporary support member; forming a third repeating structure in step form in the other surface of the light transmitting portion from which the temporary support member has been removed; forming a second electrode layer on the third repeating structure; making a second support portion adhere to the light transmitting portion via a second adhesive layer, a surface of the second support portion that makes contact with the second electrode layer having been processed into a fourth repeating structure in step form, the adhesion being made so that the third and fourth repeating structures are joined to each other; cutting, and dividing the resulting product into a plurality of structures using end portions of any of the repeating structures in step form as a cutting reference; and polishing and processing the end surfaces that have been obtained by the cutting.

10. A manufacturing method for the optical path switching device according to claim 3, comprising the steps of: forming a first electrode layer on a flat surface of a light transmitting portion, the light transmitting portion having refractive regions; making the flat surface of the light transmitting portion adhere to a first support portion via a first adhesive layer; processing the other surface of the light transmitting portion that does not make contact with the first support portion into a repeating structure of a plurality of steps; forming a second electrode layer on the repeating structure; making a second support portion adhere via a second adhesive layer to the surface of the light transmitting portion having the second electrode layer formed thereon, the second support portion having a surface that does not make contact with the light transmitting portion and that has a repeating structure in serrated form, the repeating structure in serrated form having the same period as the repetition period of the repeating structure instep form; and cutting and dividing the resulting product into a plurality of structures using end portions of the repeating structure in serrated form of the second support portion as a cutting reference.

11. A manufacturing method for the optical path switching device according to claim 4, comprising the steps of: forming a first electrode layer on a flat surface of a light transmitting portion, the light transmitting portion having refractive regions; making the flat surface of the light transmitting portion adhere to a first support portion via a first adhesive layer; processing the other surface of the light transmitting portion that does not make contact with the first support portion into a plurality of repeating structures in taper form; forming a second electrode layer on the repeating structure in taper form; making a second support portion adhere via a second adhesive layer to the surface of the light transmitting portion having the second electrode layer formed thereon, the second support portion having a surface that does not make contact with the light transmitting portion and that has a repeating structure in serrated form, the repeating structure in serrated form having the same period as the repetition period of the taper form; and cutting and dividing the resulting product into a plurality of structures using end portions of the repeating structure in serrated form of the second support portion as a cutting reference.

12. The optical path switching device according to claim 5, wherein the first electrode layer and second electrode layer are respectively formed of either a single body or portions which are physically separated from each other.

13. The optical path switching device according to claim 5, wherein the first support portion and the second support portion are each formed of conductive material.

14. The optical path switching device according to claim 6, wherein the first support portion and the second support portion are each formed of a conductive material.

15. The optical path switching device according to claim 12, wherein the first support portion and the second support portion are each formed of conductive material.

16. The optical path switching device according to claim 5, wherein the first support portion and the second support portion are each formed of an insulating material having at least one through hole, a first external electrode is formed on a surface of the first support portion which does not make contact with the light transmitting portion, a second external electrode is formed on a surface of the second support portion which does not make contact with the light transmitting portion, and the first electrode layer and the first external electrode are conductively connected to each other as well as the second electrode layer and the second external electrode are conductively connected to each other, each of the connections being made through said at least one through hole.

17. The optical path switching device according to claim 6, wherein the first support portion and the second support portion are each formed of an insulating material having at least one through hole, a first external electrode is formed on a surface of the first support portion which does not make contact with the light transmitting portion, a second external electrode is formed on a surface of the second support portion which does not make contact with the light transmitting portion, and the first electrode layer and the first external electrode are conductively connected to each other as well as the second electrode layer and the second external electrode are conductively connected to each other, each of the connections being made through said at least one through hole.

18. The optical path switching device according to claim 12, wherein the first support portion and the second support portion are each formed of an insulating material having at least one through hole, a first external electrode is formed on a surface of the first support portion which does not make contact with the light transmitting portion, a second external electrode is formed on a surface of the second support portion which does not make contact with the light transmitting portion, and the first electrode layer and the first external electrode are conductively connected to each other as well as the second electrode layer and the second external electrode are conductively connected to each other, each of the connections being made through said at least one through hole.

* * * * *